Sept. 18, 1951 J. D. BRAILSFORD ET AL 2,568,538

RADIO DIRECTION FINDER

Filed July 16, 1948 2 Sheets-Sheet 1

Inventors:
Joseph Douglas Brailsford, and
Eric Burnett Vass,
By their attorneys:
Baldwin, Wight & Prevost Inventors:
Joseph Douglas Brailsford and
Eric Burnett Vass
By their attorneys:
Baldwin, Wight & Prevost Patented Sept. 18, 1951 2,568,538

UNITED STATES PATENT OFFICE 2,568,538

RADIO DIRECTION FINDER

Joseph Douglas Brailsford and Eric Burnett Vass, Chelmsford, England, assignors to Marconi's Wireless Telegraph Company Limited, London, England, a company of Great Britain Application July 16, 1948, Serial No. 39,038
In Great Britain March 3, 1948

6 Claims. (Cl. 343—120)

This invention relates to radio direction finders and more specifically to radio direction finders of the well known so-called "switched cardioid" type. In this type of direction finder the signals from a loop aerial and an open aerial (or from some equivalent aerial system) are combined with a periodic reversal of the sense of combination. The combined signal is usually obtained in the form of a modulation of a carrier such that the modulation amplitude is a function of the angular displacement of the momentary direction of the loop with respect to the null or zero signal direction, the modulation reversing in phase during passage through the null or zero signal direction. The modulation frequency is, of course, equal to the cardioid switching frequency. The carrier for the modulation may be either the incoming signal carrier or an intermediate frequency (I. F.) derived therefrom, depending on the design of the receiver.

Figure 1:
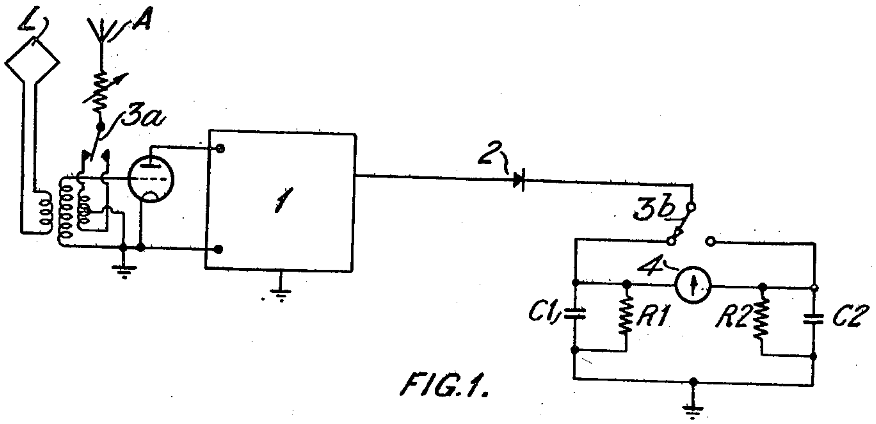
Figure 2:
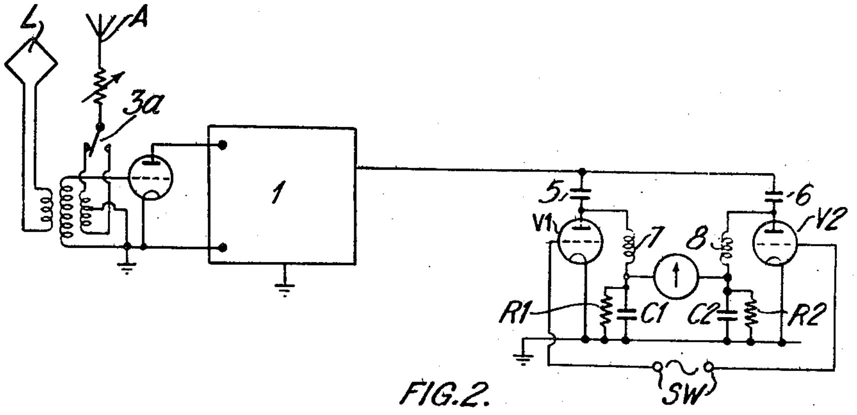
Figure 3:
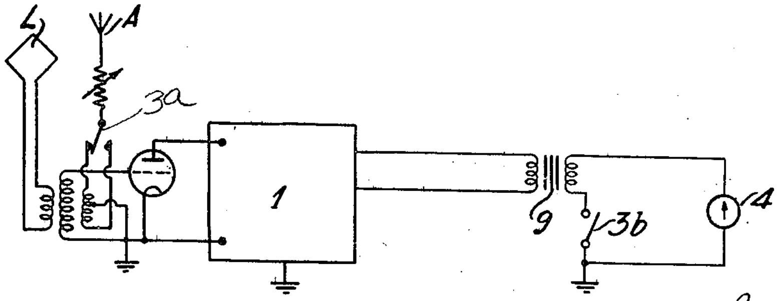
Figure 4:
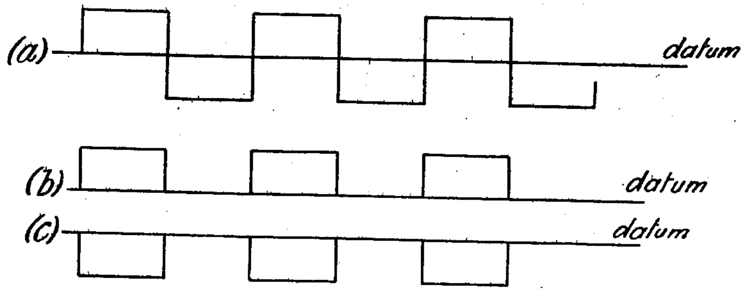
Figure 5:
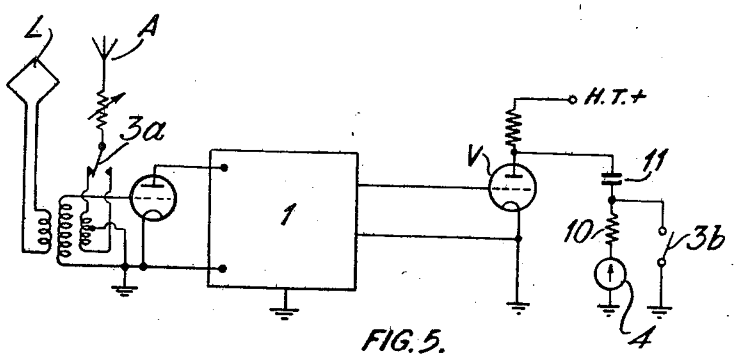
Figure 6:
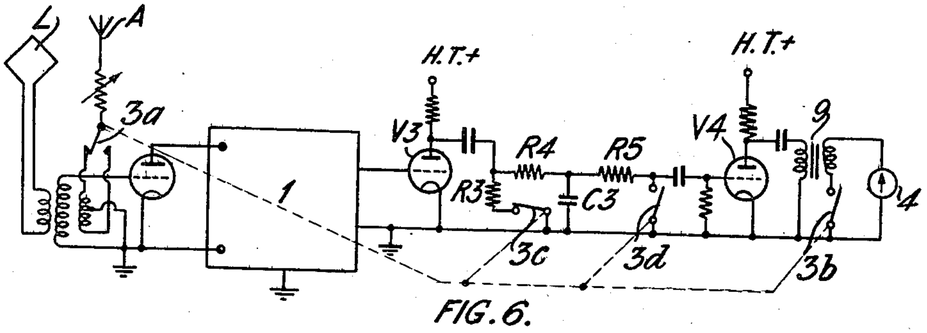

The invention is illustrated in and explained in connection with the accompanying diagrammatic drawings in which Figs. 1 and 2 are diagrams of typical known direction finding receivers reproduced herein for purposes of contrastingly explaining our invention; Fig. 3 is a simplified diagram illustrating the principle of the present invention; Fig. 4 is an explanatory graphical figure and Figs. 5 and 6 are simplified diagrams of further embodiments of the invention. Like references are used for like parts throughout the figures wherever possible.

In order that the objects and advantages of the invention may be better understood, typical known direction finders of the switched cardioid type will first be described with reference to Figs. 1 and 2.

Referring to Fig. 1 the receiver proper 1, which receives, as in the usual way, the combined signal from a loop L and an open aerial A, the sense of combination being periodically reversed by a switch 3*a* (any other equivalent aerial system would, of course, be employed) provides a low frequency output which is rectified by a rectifier 2 and thence fed via a switch 3*b*, which is operated synchronously with switch 3*a* to a bridge circuit consisting, in the example illustrated, of two arms each consisting of a resistance element R1 or R2 shunted by a capacity C1 or C2. A visual indicator 4 of the left-right type—usually a sensitive central-zero milliammeter—is connected across the bridge as shown. The switches 3*a*, 3*b* form parts of a single switch unit and are operated together to move at the cardioid switching frequency.

This well known arrangement has two important defects. In the first place, owing to the relatively very low cardioid switching frequency normally used, the normally provided second heterodyne oscillator of the receiver must be kept in continuous operation the whole time in order that the beat note therefrom may be used as a low frequency carrier to carry the cardioid switching frequency through to the switching circuit. Second, and perhaps more importantly, the switch 3*b* must have rigorously equal contact times and contact resistances in its two positions, otherwise bearing reading errors will result.

Fig. 2 shows another known arrangement at which the switching is carried out on the I. F. instead of, as in Fig. 1, on the low frequency signal. Here the receiver 1 provides an I. F. output which is fed through blocking condensers 5, 6 to the anodes of two rectifier valves V1V2 (shown by way of example as triodes) whose cathodes are connected together. The rectifiers V1V2 are rendered alternately operative at the switching frequency by means of a switching voltage wave derived in any convenient manner and applied between the control grids of V1V2 via terminals SW. The anodes of the valves V1V2 feed through H. F. chokes 7, 8 as shown, to a bridge circuit comprising elements R1C1, R2, C2 and indicator 4 and resembling that of Fig. 1.

Since, in Fig. 2, the switching is effected (by valves V1V2) on the I. F. the need (present with Fig. 1) of maintaining the second heterodyne oscillator in continuous operation is avoided but, on the other hand, the arrangement depends for accuracy on the obtaining and maintaining of balance between the valves V1V2 which must therefore be accurately matched. Although it would be possible to avoid this necessity by replacing the valves V1 and V2 by a single rectifier and a mechanical switch the said switch would then be in a pair of the circuit where large I. F. voltages are produced and inconveniently extensive and careful filtering would then be necessary to prevent I. F. instability due to coupling between the leads associated with this part of the circuit and the input leads to the I. F. amplifier.

The present invention seeks to provide improved arrangements having the advantages of the known systems hereinbefore described without their defects. A further object of the invention is to provide improved arrangements having good frequency selectivity for the reduction of noise and other interference.

According to this invention a radio direction finder of the switched cardioid type is characterized in that means, actuated at the cardioid switching frequency, are provided for securing response of the indicator device susbtantially only for alternate half-waves of said switching frequency, said device being unresponsive at other times.

Fig. 3 is a simplified diagram of one embodiment of the invention. Here the receiver 1 provides L. F. output, as in Fig. 1, which is fed through transformer 9 to a circuit including a left-right indicator 4 in series with the secondary of the transformer and with the contacts of a make-and-break switch 3*b* which is driven at the cardioid switching frequency with switch 3*a*. The L. F. amplifier of the receiver and the transformer 9 must, of course, be designed to handle without serious distortion the fundamental component of the cardioid switching frequency but this presents no great difficulties. Suppose the cardioid switching frequency appearing at the secondary of the transformer 9 can be represented by a square wave as conventionally represented at (*a*) in Fig. 4. Then the switch 3*b* is closed only during alternate half cycles of the wave at (*a*) and accordingly the current flow through the meter 4 will tend to the form shown conventionally at (*b*) in Fig. 4, assuming the loop aerial (or equivalent arrangement) is to one side of the zero or null signal position. If now the loop aerial is moved past the said zero or null signal position to the other side thereof there will be a phase reversal of the cardioid switching frequency and the current wave through the meter will tend towards that represented at (*c*) in Fig. 4. Obviously the wave forms at (*b*) and (*c*) will respectively cause deflections of the meter 4 in opposite directions. When the loop aerial is in the zero or null signal position there will be no cardioid switching frequency output and the meter 4 will not be deflected in either direction. Clearly so long as the input and output switching is effected synchronously the time periods during which the switch 3*b* is respectively open and closed need not be equal.

The arrangement of Fig. 3 employing a transformer is most suitable in those cases where the instrument 4 is of the current responsive rather than the voltage responsive type; i. e. in those cases where a heavy current is required for the instrument as, for example, when said instrument is of the low resistance moving coil type. When, however, a high resistance essentially voltage operated instrument is used the modification shown in Fig. 5 is most suitable. Here the L. F. output from receiver 1 is fed to the grid of valve V whose anode circuit contains the instrument 4 in series with resistance 10 and condenser 11, and the synchronous switch 3*b*, operated as before at the cardioid switching frequency, is arranged, when closed, to short circuit the arm containing the meter 4 and resistance 10.

An incidental but practically useful advantage of the circuits of Figs. 3 and 5 is that they are asymmetrical with respect to earth and therefore one side of the switch 3*b* can be earthed.

Another important advantage lies in the fact that the invention has frequency selective properties which can be utilized with substantial benefit for the reduction of noise and other interference effects. It will be appreciated that only those voltages which are of the same frequency as and in phase with the vibration of the switch 3*b* will produce a sustained D. C. output. This fact can be exploited to separate the desired component of modulation from noise and interference at some point in the apparatus preceding the switch 3*b*. Such an arrangement is illustrated in Fig. 6. Here L. F. output from the receiver 1 is fed to the grid of a valve V3 whose anode circuit includes a resistance R3 in series with a switch 3*c* which vibrates synchronously with the switch 3*a*. The movement of the switch 3*c* thus produces the result of rectifying the component of the L. F. output which is of the same frequency as and in phase with its own vibration and build up therefrom a charge in the condenser C3 which, in series with resistance R4 is in parallel across the circuit arm 3*c*R3. Nonsynchronous interference will not, however, be rectified by circuit arm 3*c*R3 and will not contribute to the charge in C3. By suitably dimensioning the elements R3, R4 and C3 in accordance with well known principles, undesired random fluctuations can be smoothed out. These elements constitute a low pass network equivalent to a narrow band filter so that, by suitable design, any desired degree of selectivity can be obtained at the expense of time delay.

In parallel with C3 is another circuit arm comprising resistance R5 and switch 3*d* in series. The switch 3*d* may also operate in synchronism with 3*a* but this is not necessary since its primary purpose is merely to interrupt the D. C. voltage from C3 to enable amplification by the valve V4. This valve feeds into a transformer 9 whose secondary circuit includes the left-right indicator 4 and the switch 3*b* which operates synchronously with switches 3*a* and 3*c*.

Although for the sake of simplicity, the various switch in Figs. 3, 5 and 6 have been shown as electro-mechanical, obviously other forms of switching e. g. electronic switching may be employed. In Figure 6 of the drawing switches 3*a*, 3*b*, 3*c* and 3*d* are shown as ganged together by means of dotted lines.

What we claim is:

1. In a radio direction finder of the switched cardioid type, a receiving directional aerial, a receiving non-directional aerial, means for combining the signals received upon said two aerials, means for periodically reversing the sense of combination of said signals, an indicator device, means actuated at the frequency of said periodic reversal for securing response of said indicator device substantially only for alternate half-waves of said periodic reversal frequency, and additional means actuated synchronously with said response securing means for rectifying the signal modulated cardioid switching frequency wave.

2. A radio direction finder as claimed in claim 1 wherein said additional means comprise an additional switch controlling the charging of a condenser from the signal voltage.

3. A radio direction finder as claimed in claim 1 wherein said additional means comprise an additional switch controlling the charging of a condenser from the signal voltage and forming part of a low pass filter.

4. A radio direction finder as claimed in claim 1 wherein low frequency output from the receiver circuits of the direction finder is fed to a circuit including in series an indicating instrument and a circuit opening and closing switch actuated at the cardioid switching frequency.

5. A radio direction finder as claimed in claim 1 wherein low frequency output from the receiver circuits of the direction finder is fed to a circuit including two parallel branches one of which contains an indicating instrument and the other of which contains a circuit opening and closing switch actuated at the cardioid switching frequency.

6. A radio direction finder as claimed in claim 1 wherein low frequency output from the receiver circuits of the direction finder is fed to a circuit including two parallel branches one of which contains an indicating instrument and the other of which contains a circuit opening and closing switch actuated at the cardioid switching frequency.

JOSEPH DOUGLAS BRAILSFORD.
ERIC BURNETT VASS.

REFERENCES CITED

The following references are of record in the file of this patent:

UNITED STATES PATENTS

| Number | Name | Date |
|---|---|---|
| 2,002,430 | Chromy | May 21, 1935 |
| 2,007,477 | Nickel | July 9, 1935 |
| 2,017,909 | Leib | Oct. 22, 1935 |
| 2,169,742 | Scharlau | Aug. 15, 1939 |
| 2,198,445 | Wesselink | Apr. 23, 1940 |
| 2,213,842 | Johannson et al. | Sept. 3, 1940 |
| 2,271,550 | Hermanspann et al. | Feb. 3, 1942 |